Sept. 13, 1960   L. P. F. A. NEUVILLE ET AL   2,952,455
SPRING SUSPENSION FOR VEHICLES
Filed Feb. 4, 1959   5 Sheets-Sheet 1
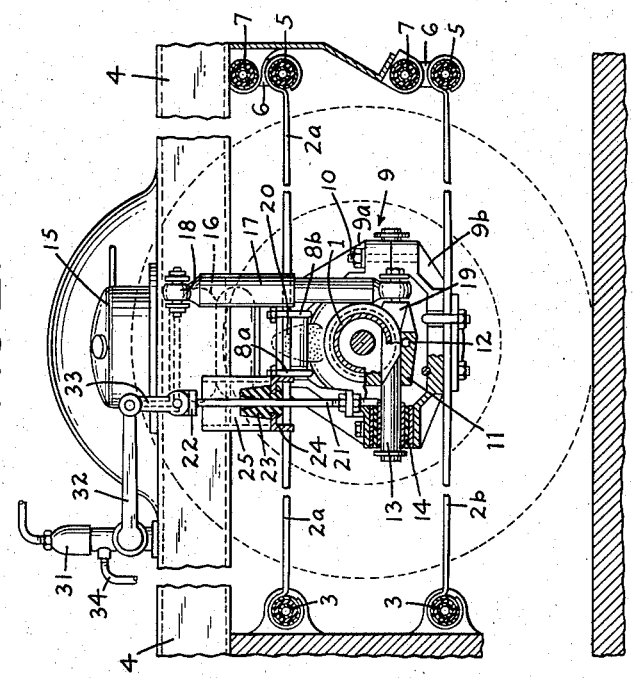
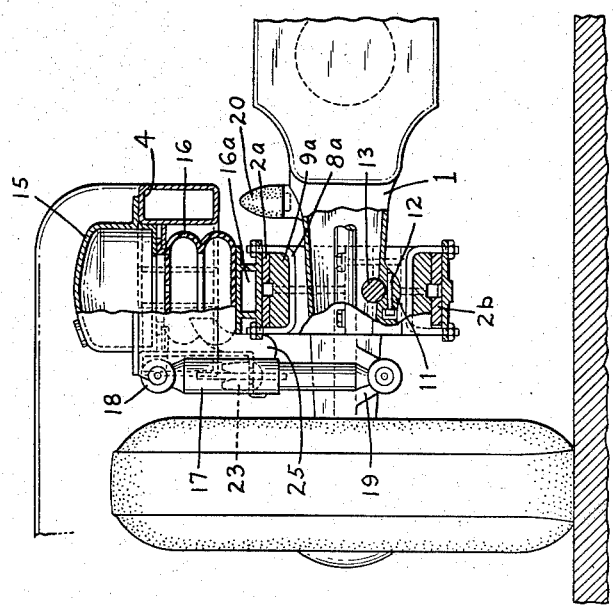
INVENTORS
LOUIS PIERRE FRANÇOIS ANDRÉ NEUVILLE
LOUIS HENRI NOËL SAINT FRISON
BY
THEIR ATTORNEYS

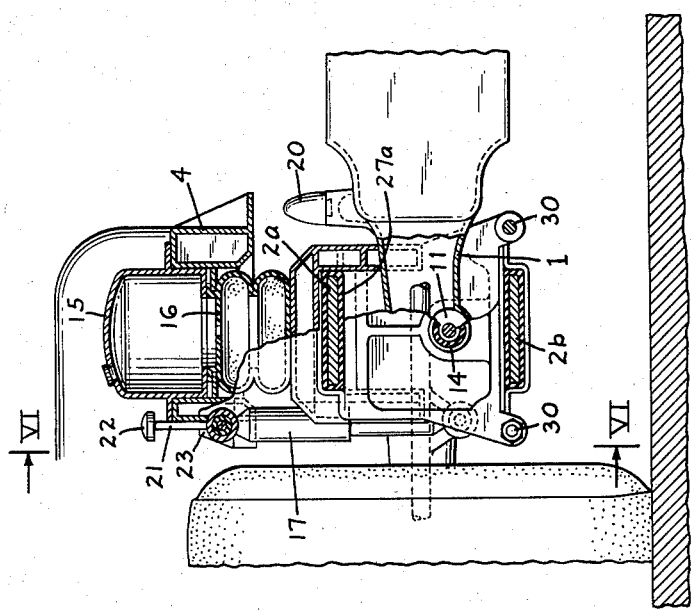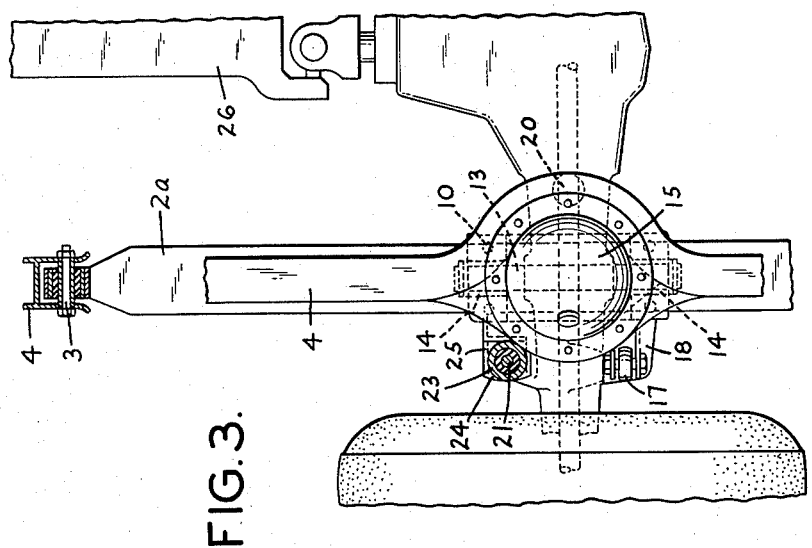

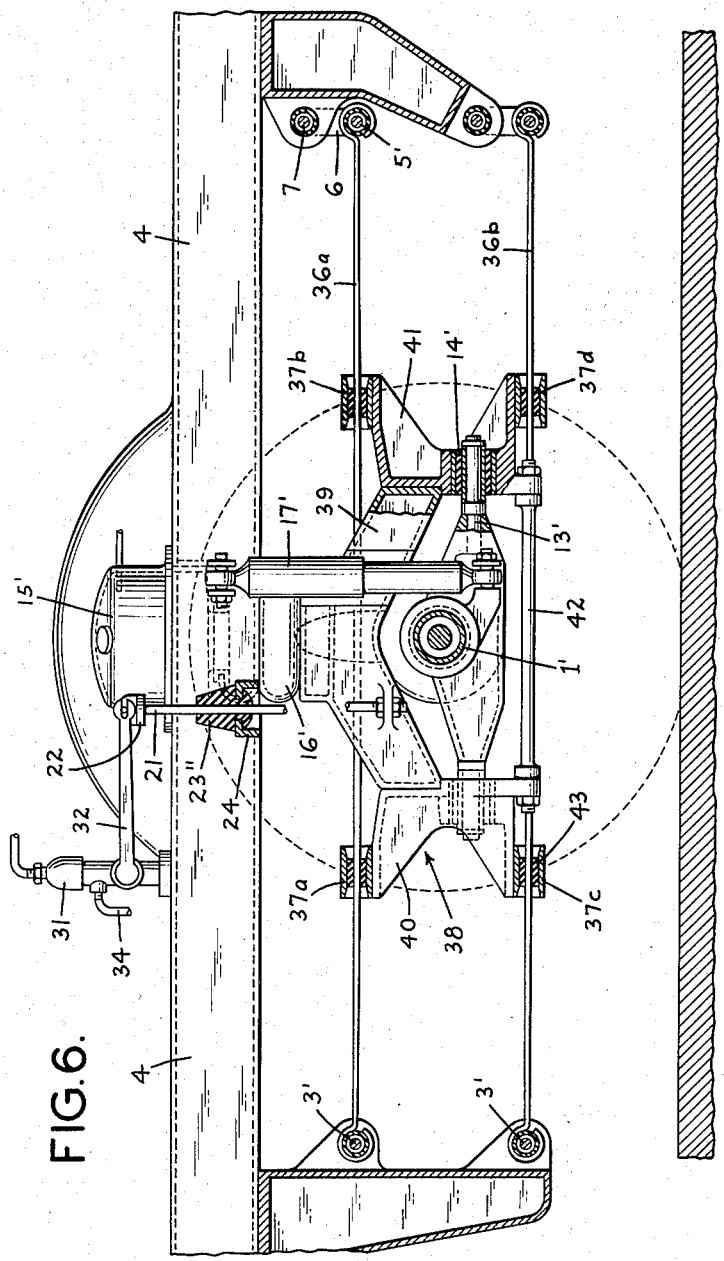

Sept. 13, 1960    L. P. F. A. NEUVILLE ET AL    2,952,455
SPRING SUSPENSION FOR VEHICLES
Filed Feb. 4, 1959      5 Sheets-Sheet 4

INVENTORS
LOUIS PIERRE FRANCOIS ANDRÉ NEUVILLE
LOUIS HENRI NOËL SAINT FRISON
BY

THEIR ATTORNEYS

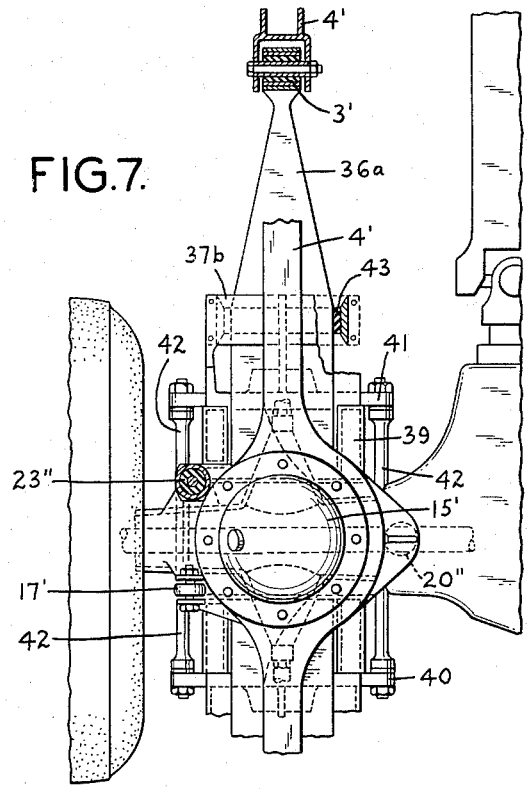
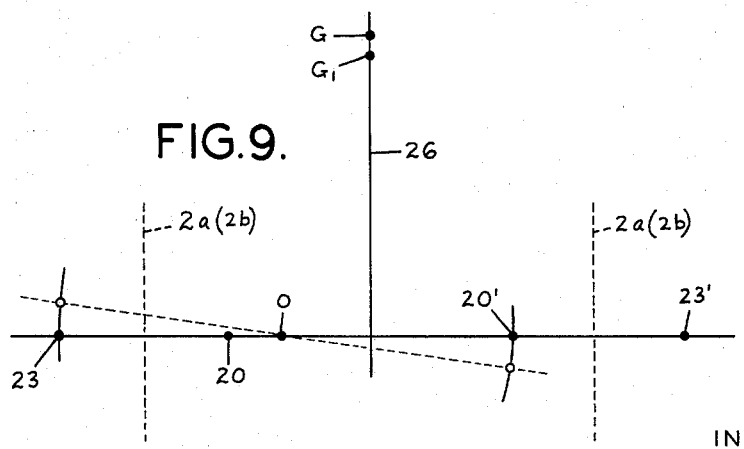

2,952,455
Patented Sept. 13, 1960

2,952,455

SPRING SUSPENSION FOR VEHICLES

Louis Pierre François André Neuville and Louis Henri Noël Saint Frison, Clermont-Ferrand, France, assignors to Compagnie Generale des Etablissements Michelin-raison Sociale Robert Puiseux & Cie., Clermont-Ferrand, France Filed Feb. 4, 1959, Ser. No. 791,063

Claims priority, application France Feb. 5, 1958

5 Claims. (Cl. 267—30)

The present invention relates to spring suspensions for vehicles and it relates particularly to a combined leaf and air spring suspension usable with either the front or rear axle of a vehicle.

In accordance with the invention, a variable rate spring suspension is provided which is capable of providing a comfortable ride under widely varying loads and road conditions and, at the same time, maintaining a predetermined static spacing between the axles of the vehicle and the frame or chassis.

More particularly, suspensions embodying the present invention include a pair of longitudinally extending leaf springs at each end of the axle and an air spring between the axle and the vehicle chassis, the leaf springs extending above and below the axle and being connected thereto between their ends to constrain the movement of the axle essentially to a vertical plane. The parallel leaf springs preferably are of such strength that they can support the unloaded weight of the vehicle but are not strong enough by themselves to carry the entire weight of the loaded vehicle. In order to support the load and compensate for variations of the load, the air springs are controlled by means of leveling valves to maintain a substantially constant spacing between the axle and the chassis.

The parallel arrangement of the leaf springs prevents rotation of the axle around its axis and spring "wind up" by engine torque and braking reaction. Moreover, substantial longitudinal movement of the axle is opposed so that transmission of the high frequency alternating longitudinal forces acting on the wheels and which give rise to vibrations and noises in the vehicle when it is operating on a rough road are largely eliminated.

The provision of relatively flexible spring leaves in combination with the load-carrying air springs imparts variable rate characteristics to the springs so that they provide a comfortable ride under substantially all loaded and unloaded conditions on roads of widely varying smoothness or roughness.

For a better understanding of the present invention, reference may be had to the accompanying drawings in which:

Figure 1 is a front elevational view of a vehicle suspension embodying the present invention, only one end of an axle and one wheel of a vehicle being shown and portions of the suspension being broken away to disclose details thereof;

Figure 2 is a lateral view corresponding to Figure 1, portions of the suspension being broken away to disclose details thereof;

Figure 3 is a top plan view of the portion of the suspension shown in Figure 1;

Figure 5 is a front elevational view of another form of suspension embodying the invention, one end of an axle and a part of one wheel of a vehicle being shown, and parts of the suspension being broken away and shown in section to disclose details thereof;

Figure 6 is a view in section taken on line VI—VI of Figure 5 with parts shown broken away to illustrate details of the suspension;

Figure 7 is a plan view of the suspension shown in Figures 5 and 6;

Figure 9 is a diagrammatic illustration of the action of the suspension in reducing leaning of the body of the vehicle during cornering.

Figure 4:
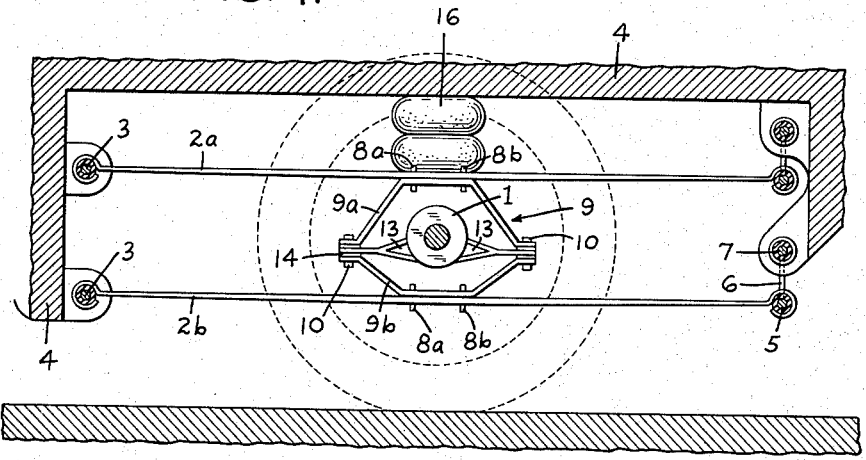
Figure 4 is a diagrammatic illustration of the suspension disclosed in Figures 1 to 3.

In the embodiment of the invention illustrated in Figures 1 to 4, the suspension comprises, at each end of the axle 1 of the vehicle, two leaf springs 2a, 2b having one or more leaves which are substantially parallel to the longitudinal axis of the vehicle and disposed above and below the axle 1, respectively. Each leaf spring has one of its ends joined by means of a rubber bushing 3 to the chassis 4, while its other end is connected by a rubber bushing 5 to a shackle 6 which is also secured to the chassis 4 by means of a rubber bushing 7. The rubber bushings or their equivalent reduce play and rattling and eliminate the need for lubricating the connections between the springs and the chassis.

Each of the leaves 2a, 2b is connected by means of two U bolts 8a and 8b, respectively, to the top and bottom of a frame or spring hanger 9 having upper and lower sections which straddle and are spaced from the axle 1 and are connected by means of the bolts 10.

In a thicker section or boss 11 formed in the underside of the end of the axle, there is fixed by means of a key 12, a shaft 13 which extends parallel to the horizontal axis of the vehicle and has its opposed ends mounted in rubber bushings 14 clamped between the frame sections 9a and 9b. The rubber bushings 14 enable the shaft 13 to rock around its axis and move endwise slightly so that the axle 1 pivots around the axis of the shaft 13 and has limited longitudinal movement relative to the vehicle frame. The shaft 13 and the rubber bushings 14 thereby serve a double purpose:

(1) They allow the axle to tilt transversely relative to the chassis and relative to the frames 9; and (2) They allow each end of the axle to have a small longitudinal movement relative to the chassis and the springs 2a and 2b in response to longitudinal shocks to which the wheel axles are subjected when the wheels roll on irregular ground. The small longitudinal movement acts to absorb shocks and thereby produces quieter and more comfortable operation of the vehicle.

The spring leaves 2a and 2b in the preferred form are of varying transverse cross section so as to constitute elements of substantially equal resistance which permit, under the best conditions, uniform deflection thereof. As shown in Figures 1 to 3, the leaves 2a and 2b are of uniform width throughout their length. They are thickest at their mid-portions at the zone of U-bolts 8a and 8b and decrease parabolically in thickness from their mid-portions to their ends.

The arrangement of the springs described maintains the frames 9 at each end of the axles in substantially parallel relation and prevents rotation of the frames 9 and the axles 1 under braking reactions and engine torque so that spring "wind up" is reduced to a minimum. Moreover, they constrain the movement of the axles to a substantially vertical plane.

An air spring which is shown in Figures 1 to 4, by way of example as including a bellows, is used in conjunction with the leaf springs 2a and 2b for supporting the vehicle body on the axle. A suitable air spring includes a rigid hollow dome 15 and a bellows 16 communicating with the dome. The dome 15 is fixed to the chassis 4 and the bellows 16 is interposed between the dome 15 and a pedestal 16a secured on top of the leaf spring 2a by means of the U-bolts 8a and 8b. Air or other compressed gas is supplied from a suitable source such as, for example, an engine-driven compressor (not shown) to the dome and bellows.

Shock absorbers 17 are connected between the brackets 18 and 19 which are fixed, respectively, to the chassis 4 and the axle 1. Each end of the axle 1 is also provided with an elastic snubber 20 which is disposed below the chassis element 4 and limits the deflection of the springs 2a and 2b to an acceptable value by engagement with the chassis.

The suspension also has a rebound snubber including a rod 21 fixed to the axle and having an enlarged head 22. The rod slides within an annular elastic snubber 23 which is carried by a support 24 having flanges 25 which are welded or otherwise secured to the chassis 4. The elastic snubber 24 in combination with the head 22 of the rod 21 limits the rebound of the suspension.

As shown in Figure 2, the head 22 of the rod is connected to the lever 32 of a leveling valve 31 by means of an interposed link or connecting rod 33 so as to control the valve 31 and thus maintain a predetermined spacing between the axle 1 and the chassis 4, regardless of the variation of the load in the vehicle within operating limits. The leveling valve admits air into the dome 15 and bellows 16 as the vehicle load increases or discharges air from the dome and bellows to keep a constant volume of air in the bellows and a uniform static spacing between the axle and chassis.

The leveling valve is of the delayed-action type allowing the spring leaves 2a and 2b and the bellows 16 to operate freely. It will be understood that the leveling valve 31 may be common to the air springs at opposite ends of each axle or separate leveling valves can be provided for the air springs at the opposite ends of the axle.

As shown in Figure 9, the snubber members 20 and 20' at the right and left-hand ends of the axle are nearer the longitudinal plane 26 of the vehicle than the rebound snubbers 23 and 23'. Assuming that the right-hand snubber 20' and the left-hand snubber 23 have the same stiffness, they will be equally compressed during hard cornering if the vehicle leans sufficiently to bring them into engagement with their corresponding abutment surfaces. The equal compression of these snubbers provides an anti-rolling moment acting on the body and tending to restore it to a level or horizontal condition. The point O which is equidistant from the snubbers 20' and 23 does not move. However, inasmuch as the axial plane 26 which contains the center of gravity G is situated between the fixed point O and the right-hand snubber 20' under the conditions shown, the center of gravity will be lowered to a point corresponding to the point G1 thereby decreasing the moment of centrifugal force around the rolling axis and the inclination of the body when cornering.

Figure 8:
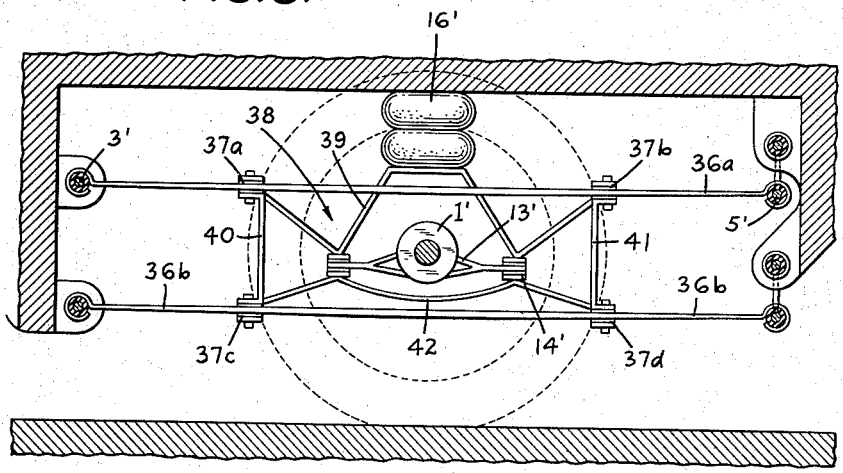
Figure 8 is a diagrammatic illustration of the suspension shown in Figures 5 to 7.

In the form of the invention disclosed in Figures 1 to 4, the portions of the leaf springs 2a and 2b between the U-bolts 8a and 8b are not deflected and thus play no part in the operation of the suspension. The form of the invention shown in Figures 5 to 8 enables the entire length of the leaf springs to take part in the action of the suspension and also allows the manufacture of the leaf springs to be simplified. Thus, in the form of the invention shown in Figures 5 to 8, each of the springs 36a and 36b extends through a pair of sleeves 37a and 37b or 37c and 37d which are formed in vertically-spaced and longitudinally-spaced relation on an axle mounting frame 38 having a central bridging member 39 extending above the axle 1' and joining the flanged end plates 40 and 41 of the frame which carry the sleeves. Tie rods 42 extend below the axle 1 and connect the lower ends of the end plates 40 and 41 to strengthen the frame. The springs 36a and 36b are received in rubber bushings 43 in the sleeves 37a, 37b and 37c, 37d so that the sleeves serve as fulcra, enabling the portion of each leaf spring 36a and 36b between them to bend in response to stresses exerted on the springs. As shown, the leaves are of constant cross-section between the sleeves 37a and 37b and gradually decrease in cross section outwardly of the sleeves toward their ends. In an ideal spring, the ends would be of zero cross section, but such an arrangement is not possible in a practical system. As shown, the ends of the leaves are connected by means of the bushings 3' and 5' to the chassis 4' of the vehicle. The maximum bending moment of the springs 36a and 36b is less than the bending moment of the springs in the form of the invention shown in Figures 1 to 4 and the springs may be lighter because they work over the entire length.

It will be understood that the axle is connected to the frame 4' in the same manner as the embodiment shown in Figures 1 to 4, and the suspension also includes shock absorbers 17', snubber members 20'' and 23'' and air springs 15', 16'.

In both embodiments of the invention, the springs act as radius rods to establish the plane of movement of the axle and they also act as links or beams which prevent spring "wind up" due to braking or engine torque. Moreover, in conjunction with the air spring, they provide a suspension of great sensitivity to irregularity in the road, enabling both minor and major irregularities to be cushioned. As the deflection of the springs is increased or tends to increase in response to greater road irregularities or greater loads in the springs, the combined resistance of the air and leaf springs to deflection increases, thereby providing the action of a variable rate spring. Moreover, the air springs and leveling valves maintain the body level and properly spaced from the axles when the vehicle is stationary, even though the load in the body may vary considerably from time to time.

From the preceding description, it will be understood that the invention is susceptible to considerable modification and, therefore, the forms of the invention described herein should be considered as illustrative.

What is claimed is:

1. A spring suspension for supporting a vehicle body on an axle comprising a pair of leaf springs extending longitudinally of said vehicle body, one of said springs extending above the axle and the other spring extending below said axle, said springs being connected to said axle and having at least one end connected to said body, an air spring interposed between said axle and said body, a resilient spring deflection snubber interposed between said axle and said body and a resilient rebound snubber interposed between said body and said axle, said deflection snubber being closer to the longitudinal center line of said body than the rebound snubber.

2. A spring suspension for supporting a vehicle body on an axle comprising upper and lower substantially parallel leaf springs extending longitudinally of the vehicle body above and below the outer end of said axle, means connecting the ends of said leaf springs to said body, a frame extending around said axle in spaced relation thereto and interposed between and connected to said springs between their ends, means connecting said axle to said frame for limited pivoting movement about an axis extending lengthwise of said springs and for limited movement along said axis, an air spring interposed between said axle and said body, and means responsive to variation in static spacing between said body and said axle to supply air under pressure to and discharge air from said air spring to maintain said static spacing constant.

3. The spring suspension set forth in claim 2 comprising means connecting said frame to said upper leaf spring at two points spaced apart a substantial distance lengthwise of said spring, means connecting said frame to said lower leaf spring at two points spaced apart a substantial distance lengthwise of said lower spring, said means connecting said springs and frame permitting relative movement and flexing of said spring between and outwardly of said spaced points.

4. The spring suspension set forth in claim 2 in which the means connecting said frame to said springs comprise resilient members interposed between said springs and frames at said points.

5. The spring suspension set forth in claim 2 in which the means connecting said frame to said leaf springs comprises sleeves on said frames and resilient bushings in said sleeves receiving said leaf springs.

References Cited in the file of this patent

UNITED STATES PATENTS

| | | |
|---|---|---|
| 2,006,644 | Lundelius et al. | July 2, 1935 |
| 2,211,647 | Collier | Aug. 13, 1940 |
| 2,466,832 | Wallace | Apr. 12, 1949 |
| 2,874,956 | La Belle | Feb. 24, 1959 |

FOREIGN PATENTS

| | | |
|---|---|---|
| 357,251 | Great Britain | Sept. 21, 1931 |